Feb. 20, 1923. 1,445,690.
F. C. IHLEE.
BAKING OVEN.
FILED AUG. 17, 1921.
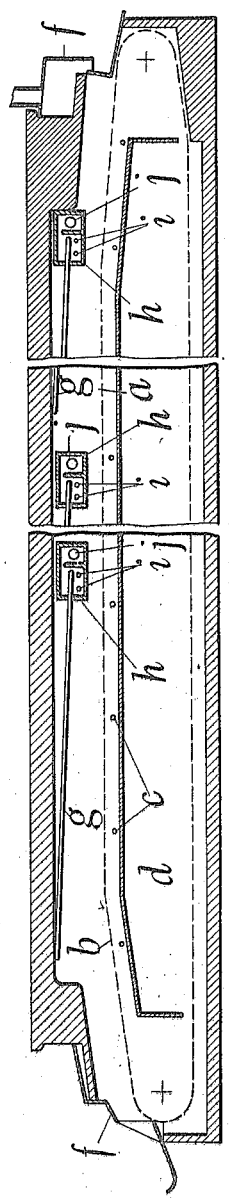
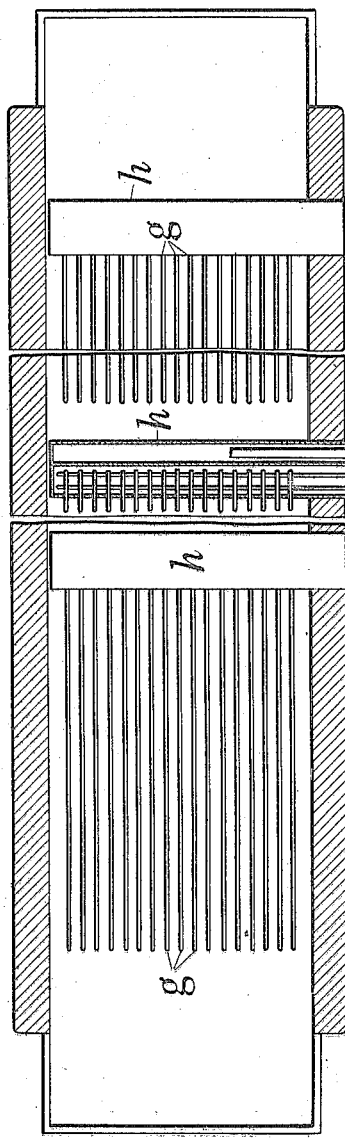
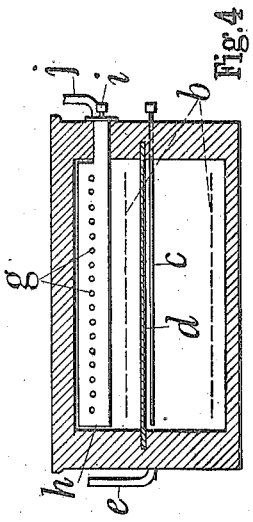
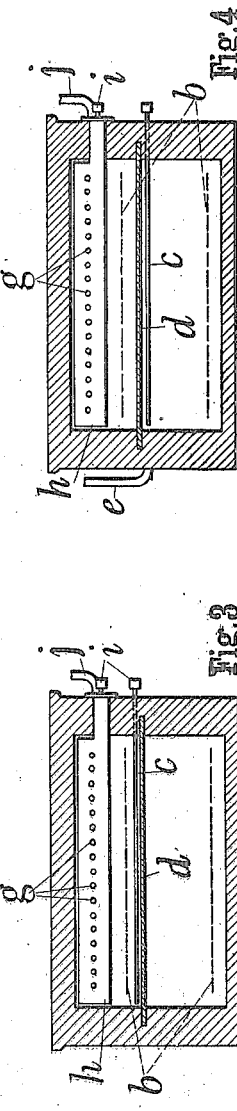
Inventor
F. C. Ihlee,
By Marks & Clerk
Attys.

Patented Feb. 20, 1923.

1,445,690

UNITED STATES PATENT OFFICE.

FREDERICK CHARLES IHLEE, OF PETERBOROUGH, ENGLAND, ASSIGNOR TO JOSEPH BAKER SONS & PERKINS LIMITED, OF LONDON, ENGLAND.

BAKING OVEN.

Application filed August 17, 1921. Serial No. 493,044.

*To all whom it may concern:*

Be it known that I, FREDERICK CHARLES IHLEE, a subject of the King of Great Britain and Ireland, residing at Westwood Works, Peterborough, in the county of Northants, England, have invented certain new and useful Improvements Relating to Baking Ovens, of which the following is a specification.

This invention relates to baking ovens and has for its object to provide for the effective heating of such ovens with the maintainance therein of an atmosphere containing the steam and gases evolved during baking or necessary or desirable in the baking of bread loaves and the like.

The invention comprises the combination of a system of direct heating of the oven or baking chamber by the combustion of gaseous fuel therein, with a system of heating involving the use of the well known Perkins or sealed steam pipes or tubes.

The invention further comprises the use of gaseous fuel combustion chambers arranged within the oven or baking chamber in association with steam pipes or tubes projecting into or extending through the said oven or baking chamber.

Referring to the accompanying sheet of explanatory drawings:

Figure 1 is a sectional elevation and Figure 2 is a sectional plan representing an oven having the invention applied thereto.

Figures 3 and 4 are sectional end views of the oven showing alternative ways of arranging the gas burners therein.

The same reference letters in the different views indicate the same or similar parts.

In one convenient application of the invention to an oven of the travelling sole-plate type as illustrated by the drawings in which the bread loaves or the like are caused to travel through the baking chamber $a$ by an endless chain or other conveyor as $b$, the said travelling sole-plate or conveyor is heated by means of coal or other combustible gas which is burned within the oven beneath the upper run or service or sole-plate portion of the said conveyor. For this purpose gas supply pipes as $c$ are disposed beneath the sole-plate, such pipes being provided with suitable burner fittings or outlets. The gaseous products of combustion from the burners may be prevented from access to the upper part of the oven, or to the actual baking chamber or area, by a screen or partition or the like as $d$, as shown in Figure 4; or the burner pipes $c$ may be disposed above such screen as shown at Figures 1 and 3. In the Figure 4 arrangement the products of combustion from the burners pass out by way of ducts or pipes as $e$, whilst with the Figures 1 and 3 arrangement they escape beneath the hoods $f$ at the ends of the oven chamber. Hinged or other doors may be provided below and in association with such hoods.

The upper part of the oven or the actual baking chamber or area $a$, has disposed therein, preferably immediately below the crown of the chamber, a number of heating elements comprising Perkins or closed ended pipes or tubes as $g$ or tubes arranged as endless loops or coils. The said tubes project into and receive heat from combustion chambers burning gaseous fuel as with the aforesaid direct heating of the lower part of the oven. Such combustion chambers as $h$ for the said pipes or tubes $g$, are preferably disposed within the oven or baking chamber as shown in the drawings, so that heat absorbed by their walls is given off to the oven chamber $a$ and its contents and thus assists the heating effect obtained by the steam pipes or tubes. In the oven illustrated each combustion chamber $h$ is fitted with a pair of burner pipes as $i$ and an outlet pipe as $j$.

The invention is applicable to ovens of various types, as, for example, to ovens with stationary soles or baking surfaces, and to draw-plate and other types of ovens with movable soles or any form of traveling baking plate.

Having thus described my invention what I claim as new and desire to secure by Letters Patent is:—

1. In baking ovens, the combination with means for the direct combustion of gaseous fuel within the baking chamber, of steam tubes projecting within the said chamber and means for heating the said tubes by the combustion of gaseous fuel in an atmosphere isolated from the atmosphere of the baking chamber, as set forth.

2. In baking ovens, the combination with the baking chamber, of steam tubes, means for the direct heating of the said chamber by the combustion of gaseous fuel therein, and means, independent of the said direct heating means, for heating the said tubes, as set forth.

3. In baking ovens, the combination within a baking chamber having means for its direct heating by the combustion of gaseous fuel therein, of steam tubes, a heating chamber into which the said tubes project, and having its interior isolated from the baking chamber, and means for the combustion of gaseous fuel within the said chamber such means being independent of the aforesaid means for the direct heating of the baking chamber, as set forth.

In testimony whereof I have signed my name to this specification.

FREDERICK CHARLES IHLEE.